(12) United States Patent
Hou et al.

(10) Patent No.: US 6,687,462 B1
(45) Date of Patent: Feb. 3, 2004

(54) WAVELENGTH SLICER FOR OPTICAL SIGNAL SWITCHING

(75) Inventors: Hongtao Hou, San Jose, CA (US); Qin Zhang, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/534,755

(22) Filed: Mar. 24, 2000

Related U.S. Application Data
(60) Provisional application No. 60/178,908, filed on Feb. 1, 2000.

(51) Int. Cl.$^7$ .......................... H04J 14/02; H04J 14/00
(52) U.S. Cl. ............................. 398/82; 398/85; 398/45
(58) Field of Search ........................ 359/124, 127, 359/117, 128, 122, 589, 618; 372/92; 398/85, 82, 45

(56) References Cited

U.S. PATENT DOCUMENTS

| | | | |
|---|---|---|---|
| 3,934,210 A | 1/1976 | Varborough et al. | 331/94.5 |
| 4,575,849 A | 3/1986 | Chun | 372/9 |
| 4,744,075 A | 5/1988 | Buhrer | 455/616 |
| 4,752,122 A | 6/1988 | Armandillo et al. | 350/448 |
| 5,694,233 A | 12/1997 | Wu et al. | 359/117 |
| 5,695,233 A | 12/1997 | Fekiman | 294/138 |
| 5,734,763 A | 3/1998 | Chang | 385/11 |
| 5,859,424 A | 1/1999 | Norton et al. | 250/226 |
| 5,867,291 A | 2/1999 | Wu et al. | 359/124 |
| 5,933,260 A | 8/1999 | Cao et al. | 359/124 |
| 5,946,116 A | 8/1999 | Wu et al. | 359/117 |
| 6,005,697 A | * 12/1999 | Wu et al. | 359/117 |
| 6,341,186 B1 | * 1/2002 | Singh et al. | 385/27 |

OTHER PUBLICATIONS

A. Saleh et al., "Two–Stage Fabry–Perot Filters as Demultiplexers in Optical FDMA LAN's", Journal of Lightwave Technology, vol. 7, No. 2, Feb. 1989.*

* cited by examiner

*Primary Examiner*—Leslie Pascal
*Assistant Examiner*—Shi K. Li
(74) *Attorney, Agent, or Firm*—Lumen Intellectual IPS

(57) ABSTRACT

A wavelength slicing apparatus and method includes two filters having passbands offset from each other and from a signal channel. The offset passbands enhance transmission where they overlap and reduce transmission where they do not overlap such that transmission of optical signals in a neighboring channel is suppressed. A third filter having a passband centered on the signal channel frequency may be included to enhance optical signal isolation. Wavelength slicing techniques may be used for channel isolation or passband flattening. Wavelength slicing can be incorporated into wavelength division multiplexing (WDM) optical switching to improve optical isolation between channels during routing, multiplexing and demultiplexing operations.

27 Claims, 10 Drawing Sheets

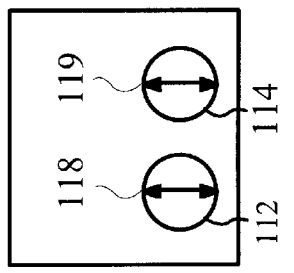
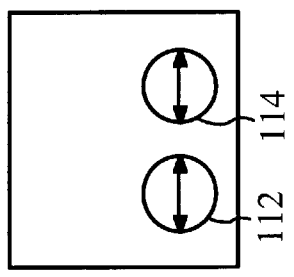
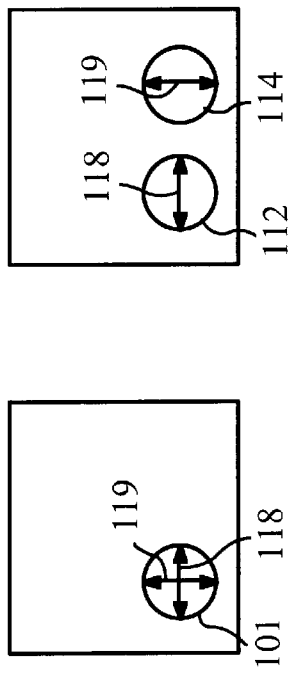
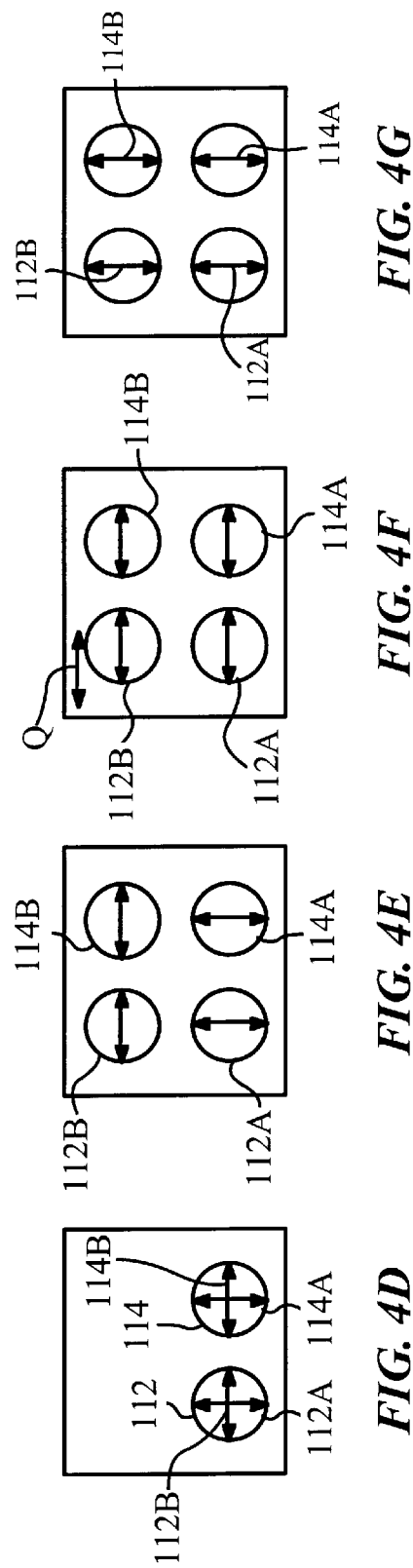

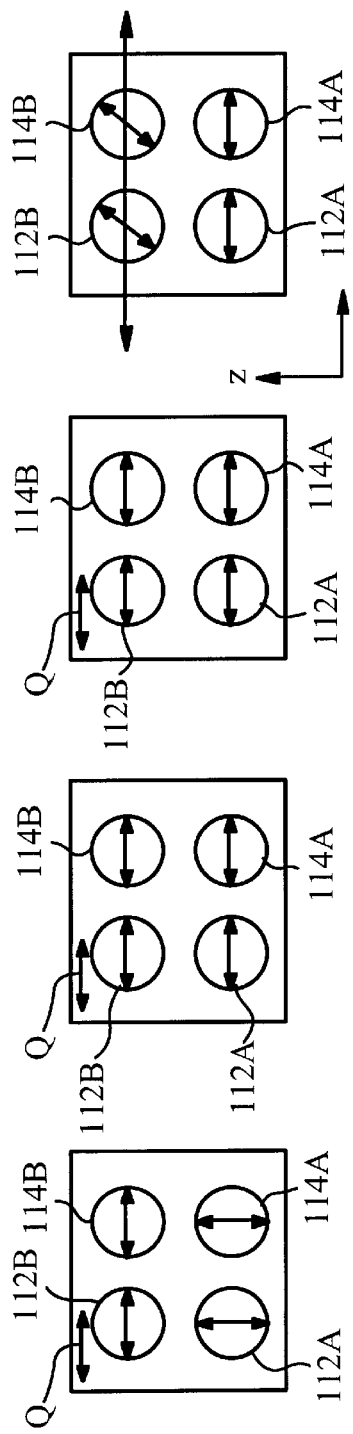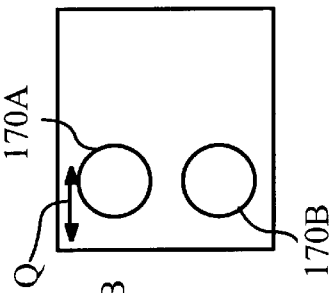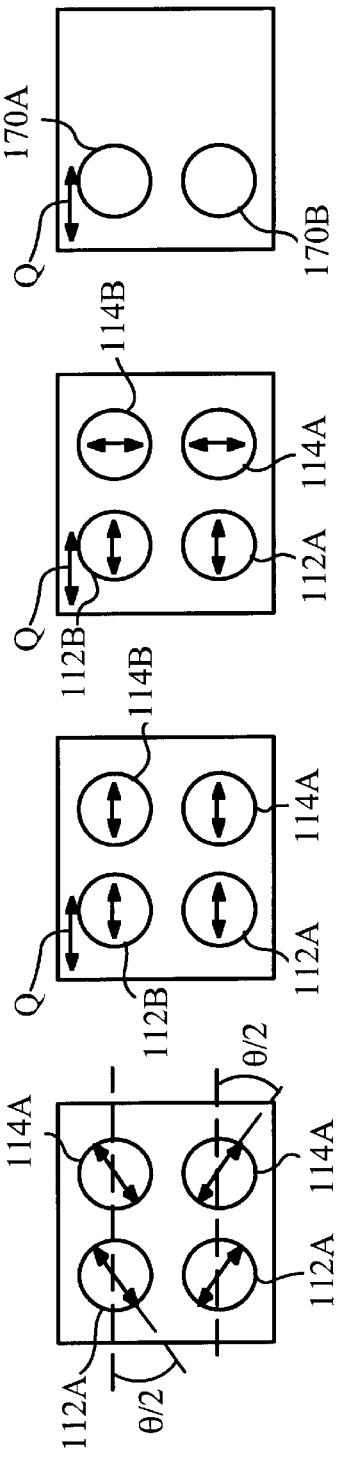

WAVELENGTH SLICER FOR OPTICAL SIGNAL SWITCHING

CROSS-REFERENCE TO RELATED APPLICATIONS

This application is based on Provisional application 60/178,908 filed Feb. 1, 2000, which is herein incorporated by reference.

FIELD OF THE INVENTION

This invention relates generally to optical communication. More particularly, it relates to optical switches for wavelength division multiplexing.

BACKGROUND ART

Optical wavelength division multiplexing (WDM) has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome, such as multiplexing, demultiplexing, and routing optical signals, if these systems are to become commercially viable. Present WDM systems are typically capable of isolating signals separated by about 100 GHz only with great difficulty. Isolation is presently not practical for optical signals separated by about 50 GHz or less.

The problem is illustrated by FIG. 1A, which depicts transmission attenuation versus frequency. A conventional filter typically has a passband 1 centered on a center frequency (or wavelength). The filter shown in FIG. 1 is a periodic filter in that the pass band repeats periodically over a range of frequencies. The passband is centered on the frequency of one or more even channels 2 and 4. Unfortunately, passband 1 also overlaps an odd channel 3. Because of this overlap some of the energy from odd channel 3 is transmitted by passband 1. This phenomenon is sometimes referred to as crosstalk. Ideally the filter should have a passband with a trapezoidal shape, like dashed curve 5, which provides about 30 dB of attenuation where the passband crosses the even channel. The isolation may be improved, as shown in FIG. 1B, by passing the optical signal through two filters having passbands centered on the same frequency. The resulting passband 6 is narrower than passband 1, but not as narrow as the ideal passband 5 of FIG. 1A. The attenuation is only about 20 dB where passband 6 crosses odd channel 3.

U.S. Pat. No. 5,946,116, issued to Wu et al. on Aug. 31, 1999 and incorporated herein by reference, describes structures for realizing optical switches (routers) that achieve very high extinction ratio operation. However, these switches are wavelength independent. U.S. Pat. No. 5,867,291, issued to Wu et al. and incorporated herein by reference, discloses systems that provide the functions of wavelength de-multiplexing and routing. However, this single stage design relies primarily on the filter design. The transmission function of the filter has to be close to an ideal square with a flat top to realize the desired low crosstalk operation. U.S. Pat. No. 5,694,233, issued to Wu et al. and incorporated herein by reference, discloses a combination of the two architectures and concepts presented in the above-cited patents to create a switchable wavelength router. This structure employs double stage filters that can obtain a better (purified) pass-band. Unfortunately, the performance of this device is less than ideal.

Another conventional filter design creates a shaped spectral response by sandwiching birefringent material (e.g., birefringent crystals) between two polarizers. Unfortunately, the polarizers tend to waste optical energy by absorbing radiation having the "wrong" polarization. U.S. Pat. No. 5,867,291, issued Feb. 2, 1999 to Wu et al. describes a filter design that creates a shaped spectral response by sandwiching a polarization rotator and a stack of birefringent waveplates having selected orientations between two birefringent polarizers. The combination acts as a polarization interference filter that selectively passes a selected set of frequencies with a horizontal polarization and a complementary set of frequencies with vertical polarization. Ideally this filter has a trapezoidal spectral response curve with a flat top. A flat top is important when each band is intended to transmit several WDM channels or to maintain the signal shape when the channels are so dense that the passband width is comparable to the signal width. By increasing the sampling points or the number of waveplates a better transmission function that more closely approximates a trapezoidal transmission with steep transitions is obtained. Theoretically this transmission function can have a perfectly trapezoidal shape in the desired spectral bandwidth. Minimum side slopes, 100% transmission, and flat top response are possible. Practically, however, the physical size limits the number of stages a practical device will sacrifice some of the features such as ripple on the top, shallower slope, and side lobe fluctuation.

There is a need, therefore, for an improved polarization filter that overcomes the above difficulties.

OBJECTS AND ADVANTAGES

Accordingly, it is a primary object of the present invention to provide a method improving optical isolation by trimming the spectra of signals. It is a further object of the invention to provide a means for flattening the transmission spectrum of an optical signal. It is an additional object of the invention to provide an optical switching apparatus incorporating trimming and flattening filters.

SUMMARY

These objects and advantages are attained by a wavelength slicing apparatus and method which includes two filters having passbands offset from each other and from a signal channel. The offset passbands reduce transmission where they do not overlap such that transmission of optical signals in a neighboring channel is suppressed. A third filter having a passband centered on the signal channel frequency may be included to enhance optical signal isolation. In one embodiment one or more of the filters selectively rotates a polarization of a portion of the signal spectrum, and passes the signal through a polarizer oriented to attenuate either the rotated portion or a non-rotated portion. The wavelength slicing techniques described herein may be used for channel isolation or passband flattening.

Wavelength slicing can be incorporated into an optical switching method to improve optical isolation between channels. In the switching method, an input optical signal is spatially separated into first and second optical signals having mutually orthogonal polarizations. The two signals are then each separated into two or more components having characteristic spectra. Polarizations of selected portions of the spectra are rotated. The components then pass through a polarizer to trim or flatten their spectra. At least one of the components is then selectively coupled to at least one of two or more outputs.

A switching apparatus incorporating wavelength-slicing elements may implement embodiments of the switching method. The apparatus generally comprises a birefringent walk-off device, a wavelength filter, a wavelength trimmer, and a flattening filter. The wavelength filter separates an input signal into two or more components each characterized by a spectrum. The wavelength trimmer typically comprises a birefringent crystal beamsplitter and a first waveplate. The wavelength trimmer typically comprises a second waveplate and a linear polarizer. The waveplate is configured to rotate certain portions, e.g., the leading or trailing edge of the spectra of the components by 90° while leaving polarizations of the center portions substantially unrotated. The polarizer is oriented to extinguish to rotated components and transmit the unrotated components. The flattening filter preferentially attenuates the peaks of the spectra to achieve a flat-topped transmission. The flattening filter may comprise a polarization rotator and a linear polarizer. The polarization rotator is configured to rotate certain portions of the spectra of the components, e.g. the peaks of spectra, by less than 90°. The polarizer is typically oriented to attenuate to rotated components to flatten the spectra.

BRIEF DESCRIPTION OF THE FIGURES

FIGS. 4A–4O depict polarization diagrams of optical signals at various stages of the apparatus of FIG. 3.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

1. Overview

Wavelength trimming can be used to cut off portions of the spectrum to produce a spectrum having a steeper slope at its edges. Alternatively, wavelength trimming can be used to flatten the top of a transmitted spectrum. The wavelength trimmer generally comprises two filters having passbands centered on frequencies that are offset from each other and a channel frequency.

Figure 2A:
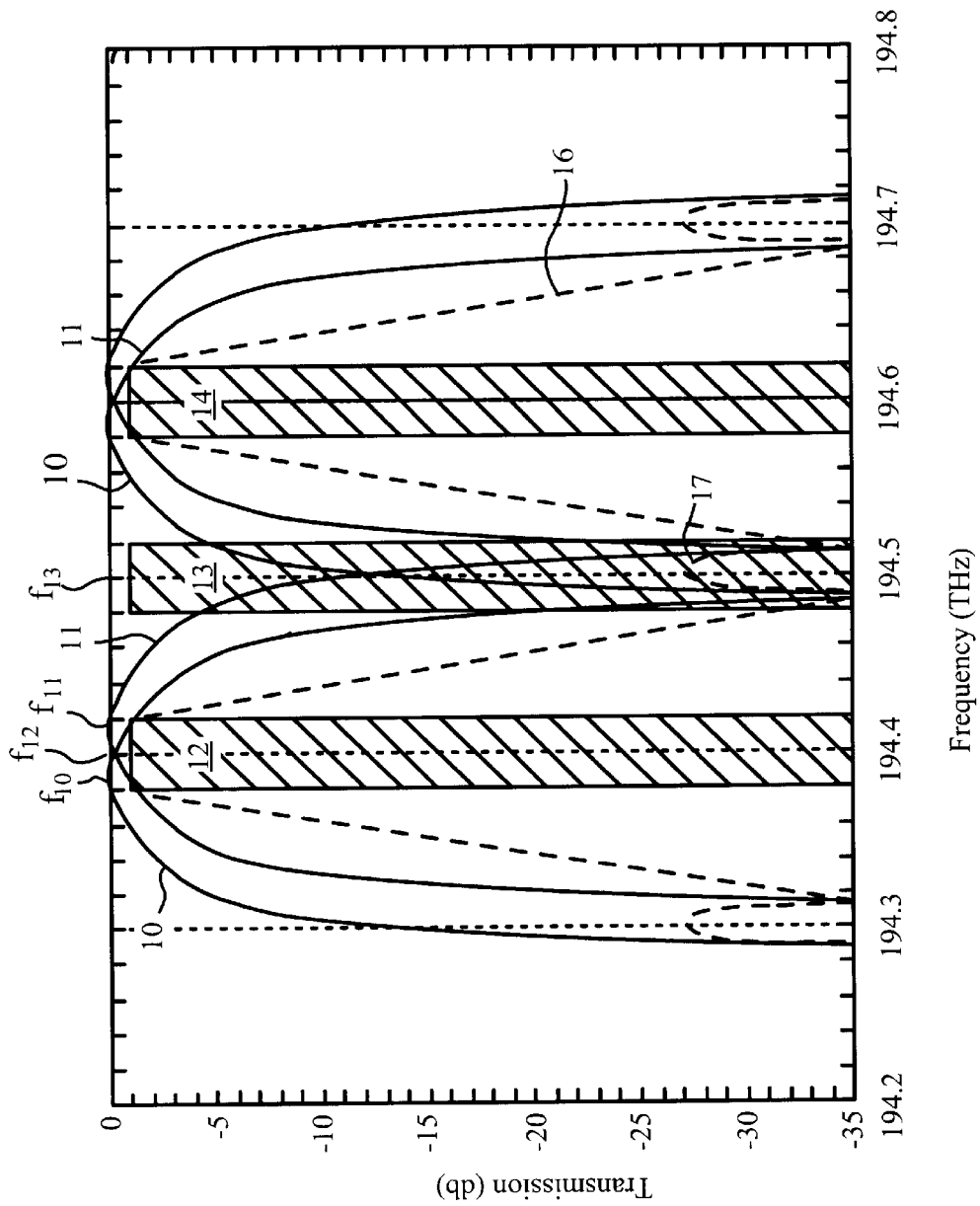
FIGS. 2A–2D depict trimming and flattening signal spectra according to embodiments of the present invention.
Figure 2B:
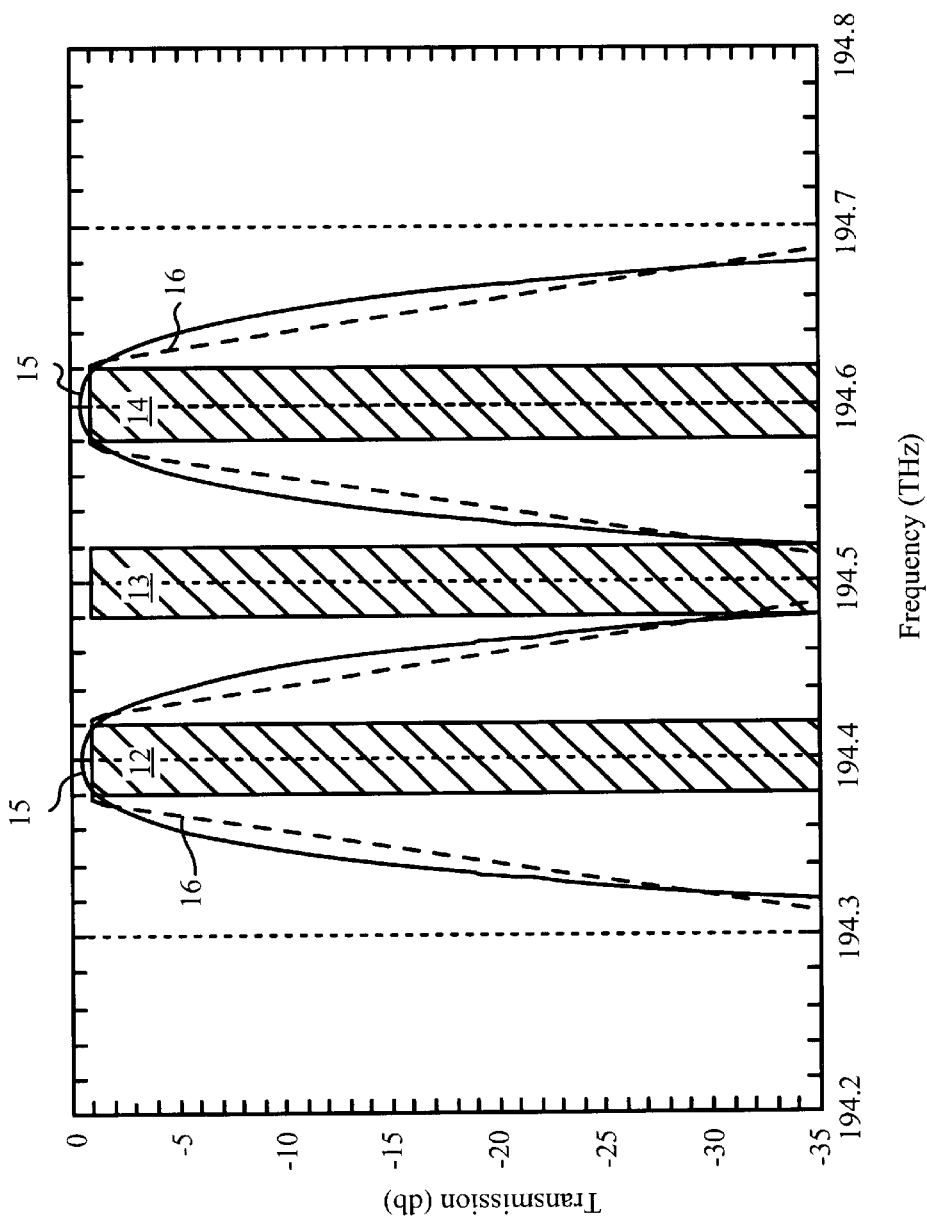
Figure 2C:
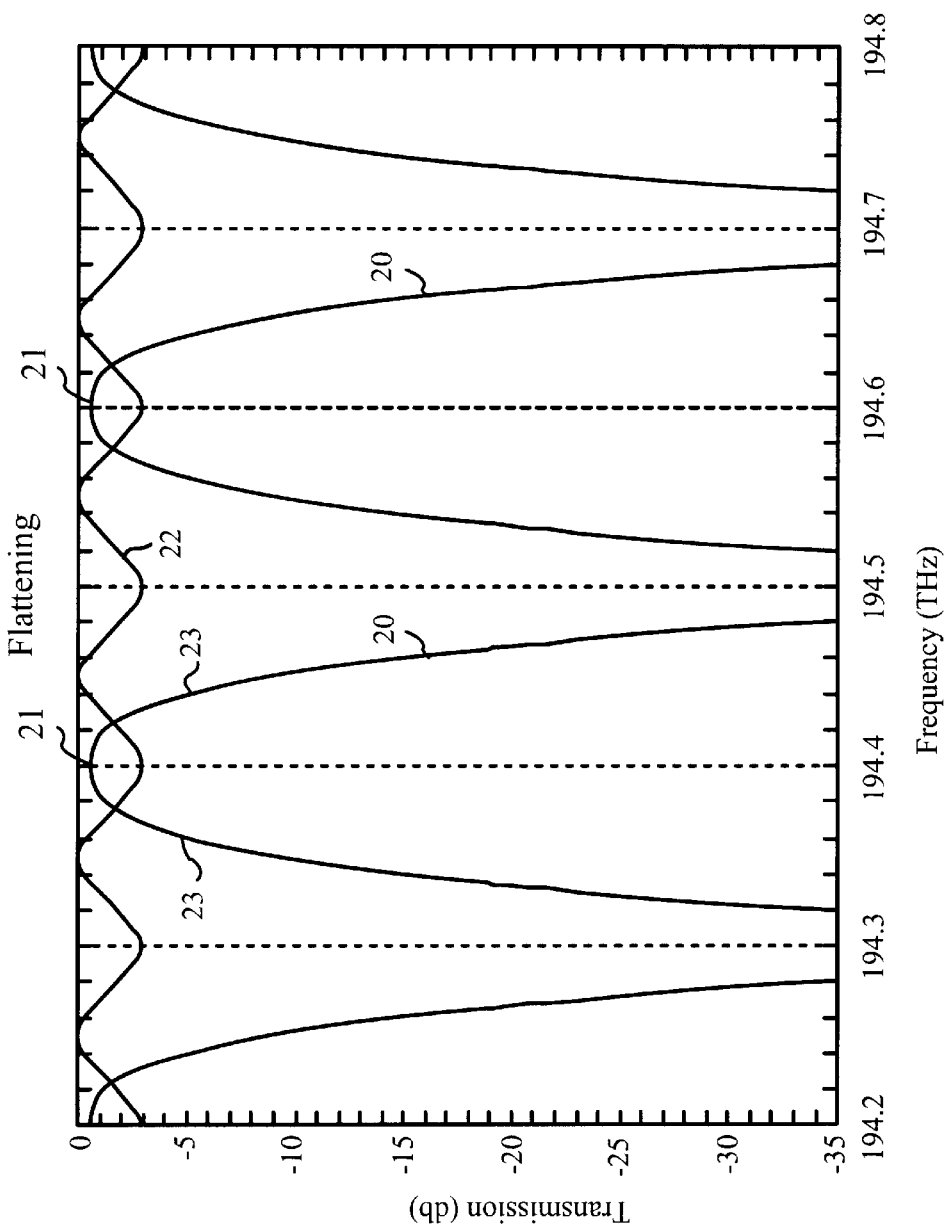

An example of wavelength trimming to increase optical isolation is depicted in FIGS. 2A–2C. FIG. 2A depicts a periodic spectrum of an optical signal. The signal depicted contains, for example, even channels 12 and 14 and odd channel 13. Channels 12, 13 and 14 pass through trimmer filters represented by passbands 10 and 11. Note that a center frequency $f_{10}$ of passband 10 is slightly offset from a center frequency $f_{11}$ of passband 11. Both center frequencies are offset from center frequencies $f_{12}$, $f_{14}$ of even channels 12 and 14.

The combination of periodic passbands 10 and 11 produces periodic passband 15. Where passband 10 overlaps with passband 11 or vice versa, the signal transmission passband 15 is greatest. Where passbands 10 and 11 do not overlap the transmission of passband 15 is least. An ideal trapezoidal passband 16 is shown in FIG. 2A for comparison. If passbands 10 and 11 are sufficiently separated, they may overlap in odd channel 13 producing a slight bulge 17 in transmission. Even with bulge 17 the transmission within the odd channel is attenuated by about 25 dB or more.

To further improve signal isolation, a third filter, having a passband centered on the center frequencies of even channels 12 and 14 may be added to the wavelength trimmer. FIG. 2B depicts the overall effect of a trimmer having filters characterized by passbands 10 and 11 and third filter characterized by a passband of similar shape centered on the even channels 12 and 14. The third filter increases the attenuation within odd channel 13. The combined passband 15 exhibits attenuation of about 35 dB where it crosses odd channel 13. This provides even better isolation than the "ideal" trapezoidal passband 16.

Embodiments of wavelength slicing, typically involve trimmer filters that rotate a polarization of a portion of the spectrum of an optical signal and before transmitting the whole signal through an appropriately oriented polarizer. The attenuation of the optical signal at a certain frequency is determined by the combination of the orientation of the polarizer and the polarization of the optical signal at that frequency. A typical trimmer filter for a wavelength slicer comprises a wavelength-selective polarization rotation device, such as a waveplate, and a polarizer.

The wavelength-selective polarization rotation device is configured, for example to selectively rotate the polarization of the center frequencies of bands 10 or 11 to a certain direction z, while leaving the other portions less polarized along z. The signals transmitted through passbands 10 and 11 pass through a polarizer having a pass direction parallel to z, such that the center frequencies of bands 10 and 11 pass through the polarizer without attenuation while the other portions are attenuated according to their respective polarization state.

For example, polarized light is generally divided into two components when entering a waveplate. As the light travels along the light path, a phase delay $\Delta\phi$ is introduced between these two components. $\Delta\phi$ is a function of both wavelength $\lambda$ and the length d of the light path through the waveplate. Specifically:

$$\Delta\phi = \frac{2\pi d}{\lambda}.$$

When the orientation of the waveplate and polarizer is properly chosen, the transmission of an optical signal is proportional to the square of the cosine of $\Delta\phi$. More specifically, the transmission is a function of the angle $\alpha$ between the polarization of the signal and the optic axis of the waveplate, the angle $\beta$ between the axis of the waveplate and the axis of the polarizer and $\Delta\phi$.

The polarizer transmits the rotated portions but not the unrotated portions. Generally, the polarizer transmission is a function of the square of the cosine of the angle of rotation induced by the waveplate. The angle of rotation induced by the waveplate is a function of the signal wavelength (or frequency) and the optical path length of the signal in the waveplate. If all three trimmer filters use crystal based waveplates, temperature changes tend to affect the index of refraction and crystal length of all three filters uniformly, which simplifies compensation of these effects. By appropriate choice of waveplate material and length the filter may be configured so that center frequencies $f_{10}$ and $f_{11}$ of passbands 10 and 11 have their polarizations rotated by 90° so that they are substantially parallel to a transmission direction of the polarizer. Consequently, this type of trimmer filter produces a periodic transmission curve of the type shown in FIG. 2A–2B. Simulations of this type of wavelength slicer configuration indicate that 50 GHz isolate in a wavelength range of about 1520 to 1600 nm (corresponding to a frequency range of about $1.875 \times 10^{14}$ to $1.973 \times 10^{14}$ Hz) is readily achievable.

The spectra of FIGS. 2A–2B tend to have a rounded peaked structure. Alternatively, the spectra may have a double peak. It is often desirable to flatten such peaks to produce transmitted spectra with a flatter top. Such flattening can be accomplished in a process having characteristics in common with that described above. In the case of double peaked spectra, the two peaks or "shoulders" would be reduced in intensity relative to the center. In the case of a single rounded peak, the center would be reduced in intensity relative to the shoulders. An exemplary flattening filter comprises a waveplate or other wavelength-selective polarization rotator and a polarizer. The polarization rotation device is configured to selectively rotate polarization of portions a signal band by a small (e.g. <90°) angle θ with respect to polarizations of other portions. Alternatively, the flattening filter may be a Fabry-Perot filter having two parallel partially reflecting surfaces. The Fabry-Perot filter tends to have a narrower bandwidth than a waveplate-based filter. However, the Fabry-Perot generally introduces less optical loss and is typically less expensive than the waveplate based design.

Figure 2D:
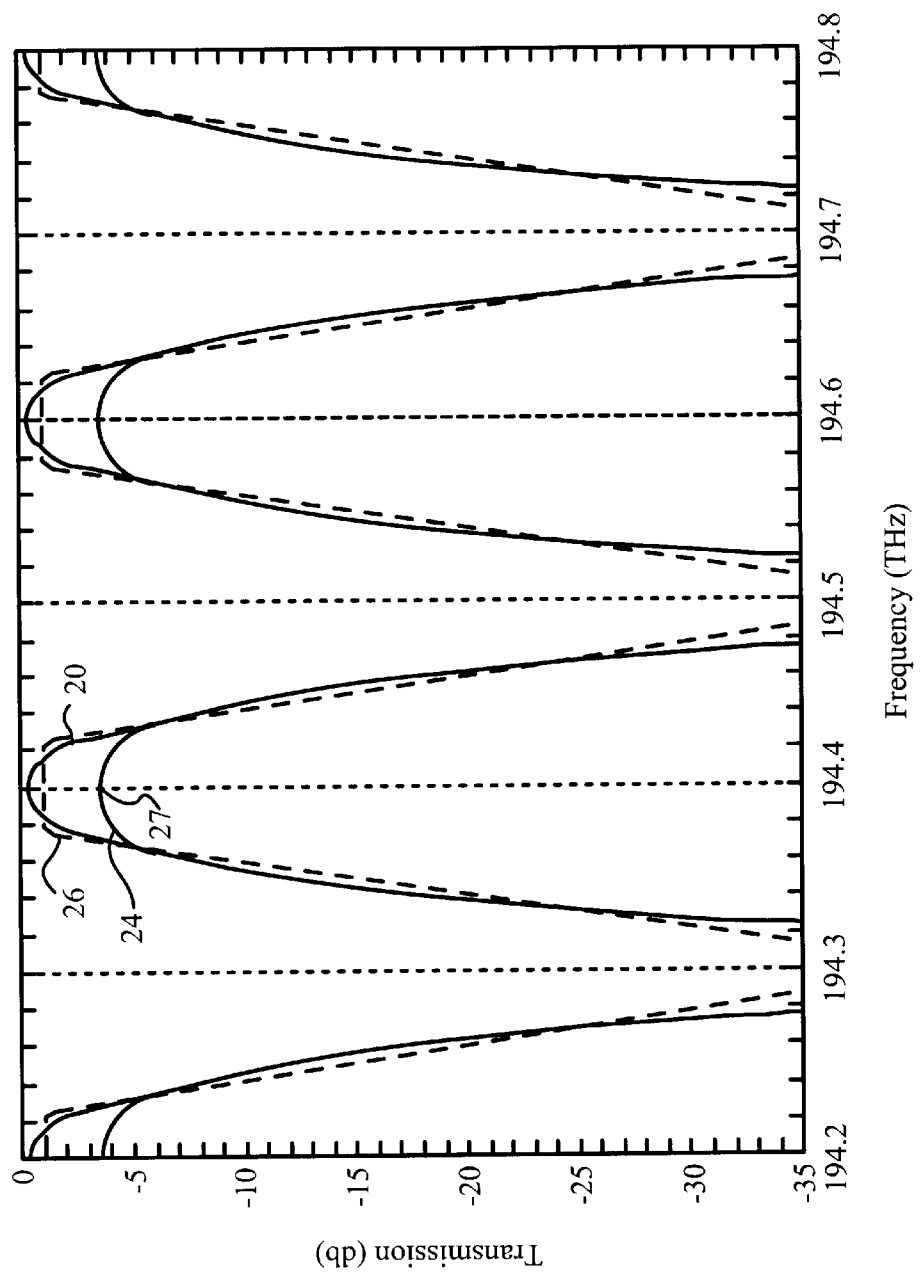

FIGS. 2C illustrates an example of the flattening process. The signals containing even and odd channels pass through filter, such as the wavelength slicer described above. The slicer has a passband 20 with rounded peaks 21 centered on even channels (not shown). The flattening filter has a transmission curve 22 configured to have a smaller transmission at peaks 21 and a larger transmission at "shoulders" 23. In the case shown in FIG. 2C, transmission curve 22 has half the period of filter transmission curve 20. As a result the combined transmission is reduced more at peaks 21 than at the shoulders 23. The resulting passband 24 is depicted in FIG. 2D superimposed over slicer passband 20 and an "ideal" trapezoidal passband 26. Passband 24 has a lower and flatter peak 27 than passband 20. Many variations on the basic flattening filter are possible. Those skilled in the art will recognize that a flattening filter having a smaller transmission at the peaks than at the shoulders can be used, for example to flatten a double peak.

2. Optical Switching Apparatus

Figure 3:
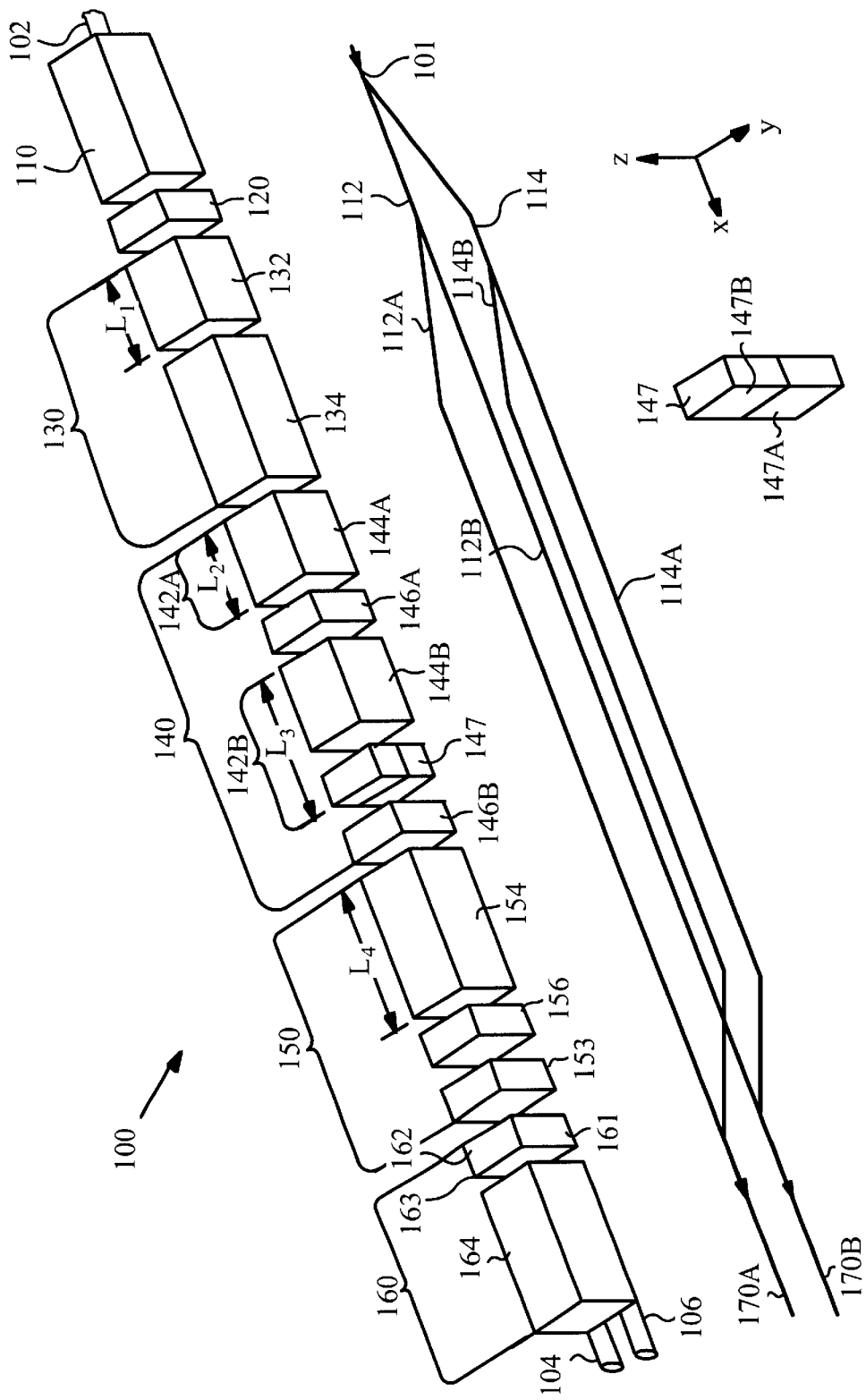
FIG. 3 depicts an isometric schematic diagram of an optical switching apparatus according to an embodiment of the present invention;.

The optical wavelength slicing described above can be incorporated into an optical switching apparatus for WDM and other applications. Optical switching in accordance with the present invention is best understood by referring simultaneously to FIG. 3 and FIGS. 4A–4O. FIG. 3 depicts an optical switching apparatus that implements wavelength trimming and flattening as described above. The optical switching apparatus 100 generally comprises an input port 102, two or more output ports 104, 106, a birefringent walk off element 110, a polarization rotator 120, a wavelength filter 130, a wavelength trimmer 140, a flattening filter 150 and a beam recombiner 160.

An input signal 101 is incident at input port 102. Input signal 101 contains at least two channels. A and B having characteristic spectra falling within distinct wavelength ranges $\lambda_A$ and $\lambda_B$ corresponding to frequency ranges $f_A$ and $f_B$ respectively. Signal 101 may contain other components in addition to A and B. Only two components are shown for the sake of simplicity. Input signal 101 is unpolarized and can be decomposed into ordinary beam 112 and extraordinary beam 114 inside walk-off element 110. Beams 112 and 114 have mutually orthogonal polarizations 118 and 119 respectively.

Input signal 101 enters birefringent element 110 as shown in FIG. 4A. The propagation paths of ordinary beam 112 and extraordinary beam 114 diverge linearly within birefringent element 110. Hence, after propagating through a length L of element 110 polarizations 118 and 119 emerge from element 110 separated or walked-off by a walk-off distance d. To achieve a larger walk off distance d, a length L of element 110 would have to be correspondingly longer. Examples of materials suitable for construction of the birefringent element 110 include calcite, rutile, lithium niobate, YVO4 based crystals, and the like.

Ordinary beam 112 and extraordinary beam 114 have mutually orthogonal polarizations as shown in FIG. 4B. Since certain subsequent operations on these beams are polarization dependent, it is convenient to rotate the polarization of one or both of them such that their polarizations are parallel to each other. Both the horizontally and vertically polarized components 112 and 114 are coupled to a polarization rotator 120. The polarization rotator 120 includes two sub-element rotators that form a complementary state, i.e. when one turns on the other turns off. Rotator 120 selectively rotates the polarization states of signals 112 or 114 by a predefined amount such that they emerge polarized parallel to each other. For example, polarization rotator 120 leaves polarization 118 of ordinary beam 112 unrotated and rotates polarization 119 of extraordinary beam 114 by 90° so that polarizations 118 and 119 are parallel as shown in FIG. 4C and 4C'. The sub-element rotators of rotator 120 may be configured to operate under the control of a control bit to produce two complementary states, i.e., both horizontal as depicted in FIG. 4C or both vertical as depicted in FIG. 4C'. This allows the apparatus 100 to selectively switch even channels contained in signal 101 to output 104 and odd channels to output 106 and vice versa.

The term polarization rotator, as used herein, refers to any optical element capable of rotating a polarization of incident light. For example, the polarization rotator 120 can be a twisted nematic liquid crystal rotator, ferroelectric liquid crystal rotator, pi-cell based liquid crystal rotator, magneto-optic based Faraday rotator, acousto-optic or electro-optic based polarization rotator. Commercially available rotators based on liquid Faraday rotation are typically used for rotator 120, although other rotator technologies may be applied to meet the needs of a particular application. These and similar basic elements are considered equivalents and may be substituted and interchanged without departing from the spirit of the present invention.

Wavelength filter 130 is generally configured to spatially separate at least one, and typically both, of beams 112 and 114 into two or more components or bands, each characterized by a distinct spectrum. To route or demultiplex component signals A and B from input signal 101, beams 112 and 114 are usually spatially separated according to corresponding spectral ranges $\lambda_A$ and $\lambda_B$. Wavelength filter 130 is typically characterized by one or more passbands more or less including spectral ranges $\lambda_A$ and $\lambda_B$.

In one embodiment, wavelength filter 130 comprises a waveplate 132, having a length $L_1$, and a beamsplitter 134. Waveplate 132 and beamsplitter 134 may be made of any suitable optical material. Preferably, both are made from a birefringent material such as calcite, rutile, lithium niobate, $YVO_4$ based crystals, and the like. $L_1$ is chosen such that waveplate 132 acts as a full-waveplate for wavelengths in spectral range $\lambda_A$, and as a half-waveplate for wavelengths in spectral range $\lambda_B$. Waves in spectral range $\lambda_A$ retain their polarization after traversing waveplate 132. After traversing waveplate 132, waves in spectral range $\lambda_B$, however, are rotated by 90° with respect to those in spectral range $\lambda_A$ as shown in FIG. 4D. Wavelengths that lie in a range between $\lambda A$ and $\lambda_B$ emerge from waveplate 132 with an elliptical polarization. Beamsplitter 134 spatially separates ordinary beam 112 into beams $112_A$ and $112_B$, which contain primarily spectra $\lambda_A$ and $\lambda_B$ respectively. In an analogous fashion, beamsplitter 134 spatially separates extraordinary beam 114 into beams $114_A$ and $114_B$, which contain primarily spectra $\lambda_A$ and $\lambda_B$ respectively as shown in FIG. 4E. Depending on the state of the switch either the wavelengths having polarizations that were rotated by waveplate 132 get displaced or the wavelengths having polarizations that were not rotated get displaced. For example, in the complementary state to that shown in FIG. 4E, beams $112_A$ and $114_A$ would be walked off from beams 112B and 114B.

Typically, the optical transmission of wavelength filter 130 is a cosine function of wavelength. Consequently, the optical isolation between $\lambda_A$ and $\lambda_B$ is relatively low. Wavelength trimmer 140 increases the optical isolation between $\lambda_A$ and $\lambda_b$ in the manner described above with respect to FIGS. 2A and 2B. Wavelength trimmer 140 generally comprises two nearly identical trimmer elements $142_A$ and $142_B$ respectively comprising waveplates $144_A$, $144_B$ and linear polarizers $146_A$, $146_B$ and a polarization rotator 147 inserted between waveplates $144_A$ and $144_B$. Light travels slightly different optical path lengths through waveplates $144_A$ and $144_B$. For example, waveplate $144_A$ has a length $L_2$ that is slightly, e.g. about 0.01%, longer than length $L_1$ of waveplate 132. Waveplate $144_A$ leaves the polarization of light in spectrum $\lambda_A$, e.g., beams $112_A$ and $114_A$, essentially unchanged while rotating the polarization of light in spectrum $\lambda_B$, e.g., beams $112_B$ and $114_B$, by 90°. Consequently, all four beams $112_B$ and $114_B$, are polarized horizontally along a direction Q as shown in FIG. 4F. In the alternative switching state all four beams are polarized vertically along direction Q' as shown in FIG. 4G. Either way, light in both spectra becomes slightly elliptically polarized after traversing waveplate $144_A$. This is because the polarization state depends on $\lambda$. FIG. 4F shows the polarization for a center wavelength $\lambda_C$ that passes through wavelength filter 130. Since trimmer elements $142_A$, $142_B$ have different lengths than beamsplitter 134, $\lambda_C$ passing through them is no longer rotated by 90° and as a result is slightly elliptically polarized. In effect, trimmer elements $142_A$ and $142_B$ have passbands that are slightly offset from the passband of wavelength filter 130. Polarizer $146_A$ may be controllable such that in an "ON" state it transmits light polarized along direction Q and in an "OFF" state it transmits light polarized perpendicular to direction Q. In the "ON" polarizer $146_A$ has a pass direction oriented in a direction Q, which is parallel to the polarization direction $\lambda_A$ had before waveplate $144_A$. In the "OFF" state polarizer $146_A$ has a pass direction perpendicular to Q. Polarizer $146_A$ reduces the transmission of part of the short wavelength side of spectra $\lambda_A$ and $\lambda_B$. As a result a pass band of trimmer element $142_A$, is shifted to longer wavelengths by a small extent relative to the passband of wavelength filter 130.

Trimmer element $142_B$ works in an analogous fashion to trimmer element $142_A$. However, trimmer element $142_B$ is configured to have a passband shifted to shorter wavelengths by a small amount relative to the passband of wavelength filter 130. For example, waveplate $144_B$ has a length $L_3$ that is slightly shorter the length $L_1$ of waveplate 132. Preferably, the absolute value of $L_1$–$L_3$ is the same as the absolute value of $L_2$–$L_1$. Waveplate $144_B$ rotates beams $112_B$ and $114_B$ by 90° with respect to beams $112_A$ and $114_A$, as shown in FIG. 4H. A shown in the inset to FIG. 3, polarization rotator 147 is made in two parts. A first part 147A is placed in the path of beams $112_A$ and $114_A$ to rotate the polarization of these beams by 90°, e.g., by Faraday rotation. A second part 147B is placed in the path of beams $112_B$ and $114_B$ to allow no change in polarization. Polarizer 146B is placed with its axis parallel to direction Q such that only light polarized along Q will pass. In a manner analogous to that described above, trimmer element rotates the polarization of beams preferentially reduces light transmission on the longer wavelength side of spectra $112_B$ and $114_B$. Alternatively, the polarization of beams $112_B$ and $114_B$ may be rotated parallel to direction Q and then sent through a single polarizer with a pass direction parallel to Q as shown in FIGS. 4I and 4J.

Flattening filter 150 flattens the transmission spectrum to produce a more nearly rectangular or trapezoidal transmission spectrum as described above with respect to FIGS. 2C–2D. Flattening filter 150 generally comprises a waveplate 154, a polarization rotator 156 and a polarizer 153. Waveplate 154 has a length $L_4$ that is identical to length $L_1$ of waveplate 132. Waveplate 154 rotates the polarization of beams $112_A$ and $114_A$ angle θ while keeping the polarization of beams $112_B$ and $114_B$ unchanged as shown in FIG. 4K. Polarization rotator 156 is placed after waveplate 154 to rotate the polarization of all four beams $112_A$, $114_A$, $112_B$, and $114_B$ by an angle –θ/2. After rotation, beams $112_A$ and $114_A$ are polarized at an angle +θ/2 with respect to Q while beams 112B and 114B are polarized at an angle of –θ/2 with respect to Q as shown in FIG. 4L. Polarizer 153 is configured with its pass axis parallel to Q to preferentially attenuate the peak intensity of all four beams 112A, 112B, 114A, 114B.

Beam recombiner 160 recombines the two sets of beams $112_A$, $112_B$ and $114_A$, $114_B$ to form output signals 170A and 170B respectively. Beam recombiner 160 generally comprises a polarization rotator 162 and a birefringent element 164. Polarization rotator 162 typically has two sub-elements 161 and 163 that intercept the four parallel beams $112_A$, $112_B$ and $114_A$, $114_B$. The two sub-elements of the rotator 162 are set at a complementary state to the rotator 120, i.e. when rotator 120 is turned on/off, rotator 162 is turned off/on. By way of example, rotator 162 rotates the polarization of beams $112_B$ and $114_B$ is rotated by 90°, and beams $112_A$ and $114_A$ are passed without change of polarization as shown in FIG. 4N. This results in orthogonal polarization pairs $112_A$, $112_B$ and $114_A$, $114_B$ respectively for spectral bands $\lambda_A$ and $\lambda_B$ at the output of the second rotator 162. Birefringent element 164 combines beams $112_A$ and $114_A$ to form output beam 170A, and beams $112_B$ and $114_B$ to form output beam 170B as shown in FIG. 4O. Output beams 170A and 170B are routed to output ports 102 and 104 respectively. Those skilled in the art will recognize that if rotators 120 and 162 are switched to their complementary states, output beam 170A will be routed to output 104 and output beam 170B will be routed to output 102.

Those skilled in the art will realize that, in the complementary state to that described above, starting with FIG. 4C' output beam 170A would be routed to port 104 and output beam 170B would be routed to port 102.

3. Applications

Figure 5A:
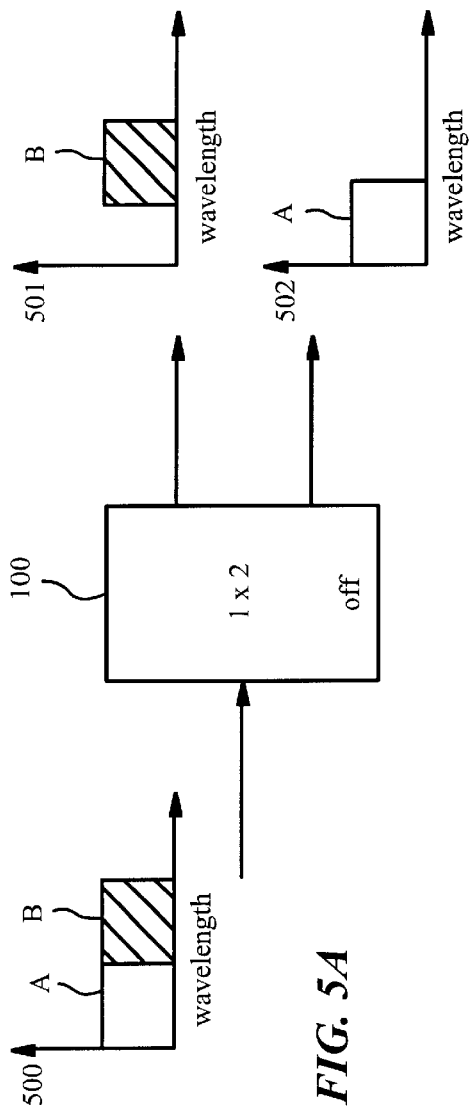
FIGS. 5A and 5B depict block diagrams illustrating the general functionality of embodiments of the switching apparatus of present invention.
Figure 5B:
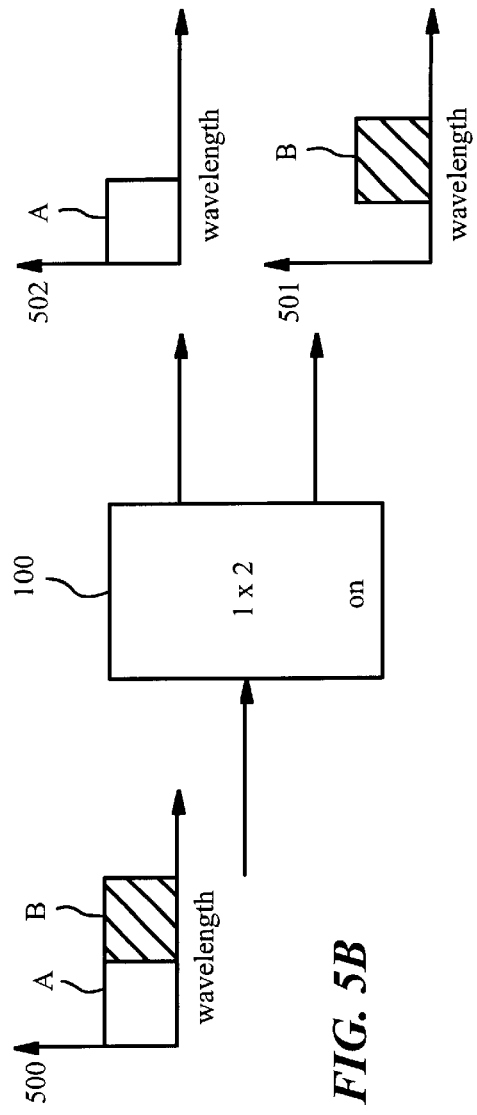

Embodiments of the optical switching apparatus of the present invention both demultiplex (i.e., spectrally separate) and route (i.e., spatially permutate) wavelength division multiplexed (WDM) optical signals. FIGS. 5A and 5B are block diagrams illustrating the general functionality of embodiments of the switching apparatus of present invention. A WDM signal 500 consists of multiple channels, with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

Signal 500 is input using conventional optical signal coupling techniques to input port 102 of optical switching apparatus 100 configured as a wavelength router. By switching the control signal applied to rotators 120 and 162 between two control states (e.g., on and off), the apparatus 100 generates two unique output signals 501, 502 at its output ports, where the input WDM spectrum is split into two bands A and B. Band A, for example, is offset to shorter wavelengths with respect band B by a certain amount as shown in FIG. 5A. The two spectral bands are trimmed by wavelength trimmer 140 and flattened by flattening filter 150. The two signals are then routed to the output ports according to the control state of apparatus 100, as depicted in FIGS. 5A and 5B. The two output spectra can be symmetric or asymmetric depending on the functionality required by the WDM system.

For optical channel demultiplexing, symmetric spectra at the two output ports are usually preferred. In addition, a second stage wavelength router with a wider spectral response can be cascaded after the outputs of the first stage to further splice the spectra and produce even narrower spectral bandwidths. In an asymmetric spectra design, the wavelength router can be used as an add/drop filter for a WDM network node. Here, a specific optical channel can be added or dropped through the narrower band of the asymmetric spectra of the wavelength router, while the rest of the channels continue past the wavelength router through the wider complementary spectrum. This allows WDM signals enter or leave the network as they travel within the WDM network.

Figure 1A:
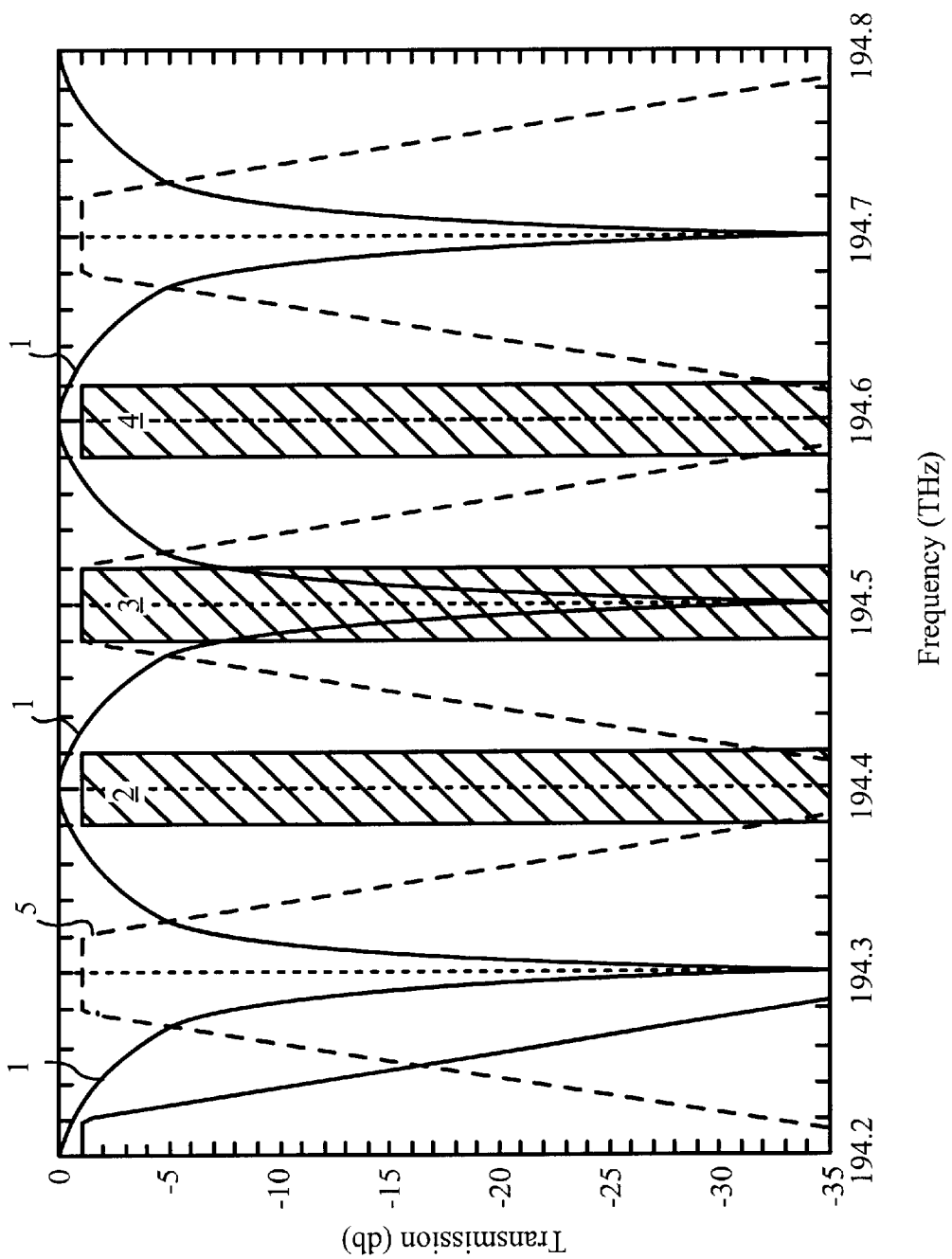
FIGS. 1A–1B depict frequency isolation of signal spectra according to the prior art.
Figure 1B:
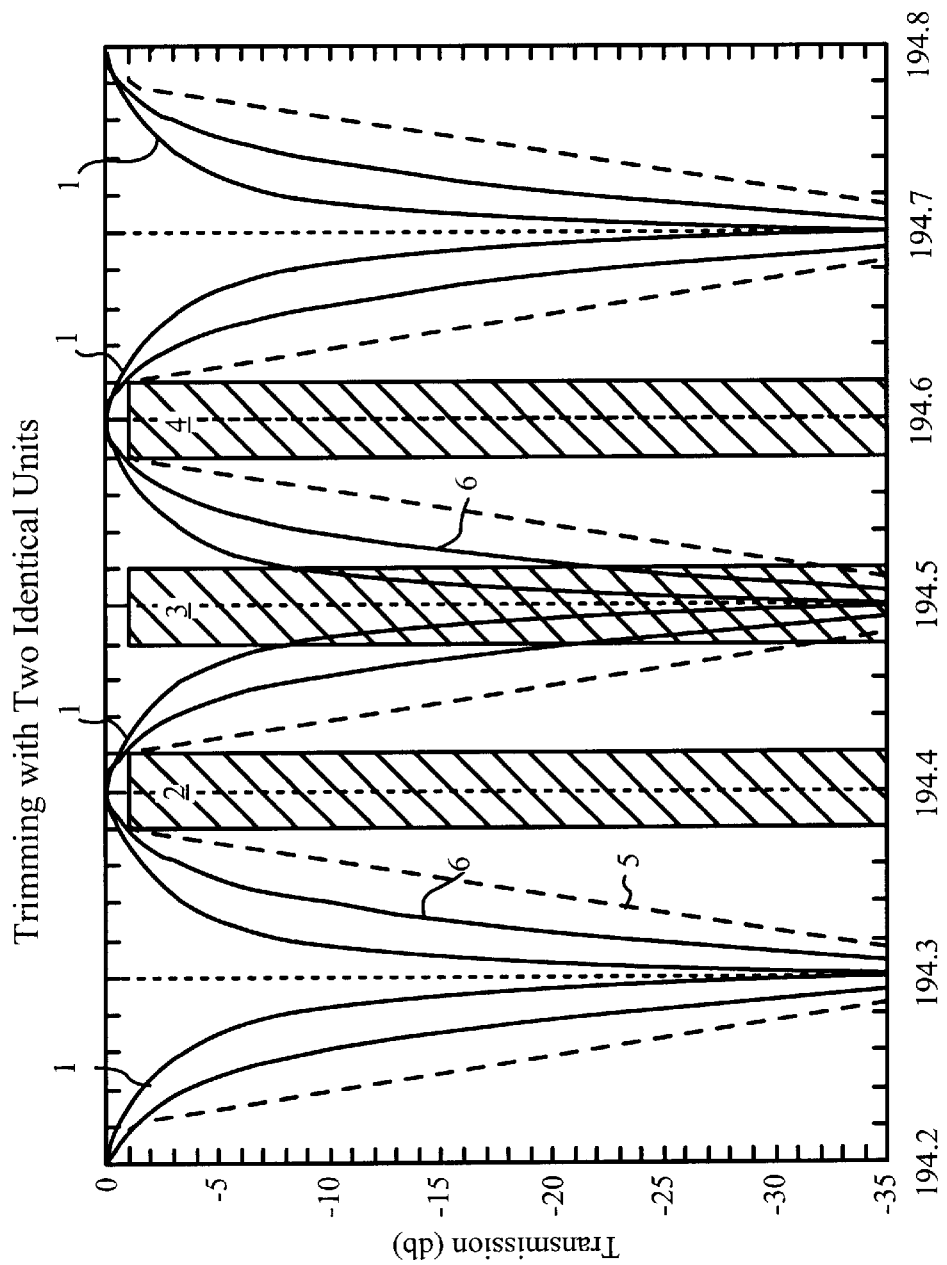

It will be clear to one skilled in the art that the above embodiment may be altered in many ways without departing from the scope of the invention. For example, the apparatus depicted in FIG. 1 can be modified to demultiplex an input signal into three or more output signals. Similarly, the optical switching apparatus of FIG. 1 may be suitably modified for operation as either a multiplexer or a router for any number of different input optical signals. Accordingly, the scope of the invention should be determined by the following claims and their legal equivalents.

What is claimed is:

1. A wavelength slicing apparatus, comprising:
a) a first filter having a plurality of first periodic passbands characterized by a plurality of first frequency peaks offset from a plurality of frequency channels of an optical signal; and
b) a second filter optically coupled to the first filter having a plurality of second periodic passbands characterized by a plurality of second frequency peaks at offset from the plurality of frequency channels and from the plurality of first frequency peaks;
wherein the first periodic passbands and the second periodic passbands partially overlap with each other and contain the plurality of frequency channels.

2. The apparatus of claim 1 wherein the first and second passbands partially overlap such that transmission of optical signals in one or more neighboring channels is suppressed.

3. The apparatus of claim 1 wherein the first and second passbands partially overlap such that transmission of optical signals near said first frequency peaks is suppressed to flatten a transmission curve of the apparatus.

4. The apparatus of claim 1 further comprising:
c) a third filter optically coupled to the first filter having a plurality of third periodic passbands characterized by a plurality of third center frequency peaks substantially the same as the plurality of frequency channels.

5. The apparatus of claim 4 wherein at least one of the first, second and third filters selectively rotates a polarization of a portions of the optical signal by an amount that depends on a frequency of the portion.

6. The apparatus of claim 5 wherein the selectively rotated portions is rotated by an angle of 90°.

7. The apparatus of claim 5 wherein the selectively rotated portions is rotated by an angle of less than 90°.

8. The apparatus of claim 5 further comprising a polarizer optically coupled to at least one of the first, second, and third filters.

9. The apparatus of claim 1, further comprising an optical flattening filter characterized by a transmission curve having a lower transmission at a signal frequency than at a range of frequencies above or below the signal frequency.

10. The apparatus of claim 9 wherein the flattening filter includes a rotator that selectively rotates a polarization of a portions of the optical signal by an amount that depends on a frequency of the portion.

11. The apparatus of claim 10 further comprising a polarizer optically coupled to the rotator.

12. The apparatus of claim 9, wherein the flattening filter includes a Fabry-Perot filter having two parallel partially reflecting surfaces.

13. An optical wavelength filtering method, comprising:
a) transmitting an optical signal through a first filter having a plurality of first periodic passbands characterized by a plurality of first frequency peaks offset from a plurality of frequency channels of an optical signal; and
b) transmitting the optical signal through a second filter optically coupled to the first filter having a plurality of second periodic passbands characterized by a plurality of second peaks offset from the plurality of frequency channels and from the plurality of first frequency peaks;
wherein the first periodic passbands and the second periodic passbands partially overlap with each other and contain the plurality of frequency channels.

14. The method of claim 13 wherein the first and second passbands partially overlap such that transmission of optical signals in one or more neighboring channels is suppressed.

15. The method of claim 13 wherein the first and second passbands partially overlap such that transmission of optical signals near said first frequency peaks is suppressed to produce a flattened transmission curve.

16. The method of claim 13 further comprising:
c) transmitting the optical signal through a third filter having a plurality of third periodic passbands characterized by a plurality of third center frequency peaks substantially the same as the plurality of frequency channels.

17. The method of claim 16 wherein at least one of the first, second and third filters selectively rotates a polarization of a portion of the optical signal by an amount that depends on a frequency of the portion.

18. The method of claim 17 wherein the selectively rotated portions is rotated by an angle of 90°.

19. The method of claim 17 wherein the selectively rotated portions is rotated by an angle of less than 90°.

20. The method of claim 17 further comprising transmitting the optical signal through a polarizer.

21. The method of claim 13, further comprising transmitting the optical signal through an optical flattening filter characterized by a transmission curve having a lower transmission at the frequency channels than at a range of frequencies between the frequency channels.

22. The method of claim 21 wherein the flattening filter selectively rotates a polarization of a portions of the optical signal by an amount that depends on a frequency of the portion.

23. The method of claim 21 further comprising transmitting the optical signal through a polarizer.

24. An optical switching apparatus, comprising:
a) a birefringent walk-off device configured to spatially separate an input signal into first and second optical signals having mutually orthogonal polarizations,
b) a first polarization rotator, optically coupled to the walk-off device configured to selectively rotate a polarization of at least one of the first and second optical signals;
c) a wavelength slicer including
i) a first filter having a plurality of first periodic passbands characterized by a plurality of first center frequencies offset from a plurality of frequency channels of an optical; and
ii) a second filter having a plurality of second periodic passbands characterized by a plurality of second center frequencies offset from the plurality of first center frequencies and the plurality of frequency channels;
wherein the first periodic passbands and the second periodic passbands partially overlap with each other and contain the plurality of frequency channels.

25. The optical switching apparatus of claim 24 further comprising a flattening filter optically coupled to the first polarization rotator and the first and second filters, configured to spatially separate at least one of the first and second signals into two or more components, wherein each component is characterized by a spectrum.

26. The optical switching apparatus of claim 24 further comprising means, coupled to the wavelength slicer, for selectively coupling the first and second optical signals to at least one output port.

27. The optical switching apparatus of claim 24 wherein the wavelength slicer further includes a third filter optically coupled to at least one of the first and second filters, the third filter having a plurality of third periodic passbands characterized by a plurality of third center frequencies substantially the same as the frequency channels.

* * * * *